United States Patent [19]

Jackson

[11] Patent Number: 4,625,258
[45] Date of Patent: Nov. 25, 1986

[54] CERAMIC CAPACITORS AND DIELECTRIC COMPOSITIONS

[75] Inventor: Dawn A. Jackson, Old Harlow, England

[73] Assignee: Standard Telephones and Cables, Public Limited Co., London, England

[21] Appl. No.: 706,790

[22] Filed: Feb. 28, 1985

[30] Foreign Application Priority Data

Mar. 3, 1984 [GB] United Kingdom ............... 8405650

[51] Int. Cl.$^4$ ................. H01G 4/10; C04B 33/34; C04B 35/46
[52] U.S. Cl. ................. 361/321; 264/61; 501/135
[58] Field of Search ............ 252/519, 521; 264/61; 501/134, 135; 361/321, 320

[56] References Cited

U.S. PATENT DOCUMENTS 3,495,996  2/1970  Delaney et al. ............ 361/320 X
3,682,766  8/1972  Maher ............................ 264/61 X

FOREIGN PATENT DOCUMENTS 137006     10/1979  Japan ............................ 361/321
134399     10/1979  Japan ............................ 501/135
153811     12/1979  Japan ............................ 501/134
57-188456  11/1982  Japan .
2137187     3/1984  United Kingdom .
2126575    10/1984  United Kingdom .

OTHER PUBLICATIONS

Chemical Abstracts vol. 83, No. 16 Oct. 20, 1975, p. 625 No. 140606r, Columbus, Ohio, B. A. Malkor "Lead Magnoniobates of Different Compositions".
Chemical Abstracts vol. 98, No. 16 Apr. 18, 1983, p. 302 No. 131241a, Columbus, Ohio.

*Primary Examiner*—Donald A. Griffin
*Attorney, Agent, or Firm*—Dennis P. Clarke

[57] ABSTRACT

A dielectric composition comprising a ternary system of non-stoichiometric lead magnesium niobate, non-stoichiometric lead zinc niobate and non-stoichiometric lead iron niobate up to 10 wt % PbO may be added to the ternary mix. Compositions with firing temperatures in the range 950° to 1040° C., have dielectric constants in the range 13,900–22,100 making the composition particularly suitable for high silver content multilayer ceramic capacitors.

15 Claims, No Drawings

CERAMIC CAPACITORS AND DIELECTRIC COMPOSITIONS

BACKGROUND OF THE INVENTION

This invention relates to ceramic capacitors and in particular, but not exclusively, to multilayer ceramic capacitors and dielectric compositions for use therein.

A multilayer ceramic capacitor basically comprises a stack consisting of a plurality of dielectric members formed of a ceramic material, with electrodes positioned between the members. The electrodes may be screen-printed onto the ceramic material, in the unfired state thereof, using conductive inks. A stack of screen-printed dielectric members is assembled, pressed together, cut into individual components, if appropriate, and fired until sintering occurs, in order to ensure non-porosity. The internal electrodes may be of rectangular form and cover the whole or part of the area of the adjacent dielectric layers. The internal electrodes in successive layers may be sideways stepped relative to one another or have elongate portions which cross one another, as described in our G.B. Application No. 7841677 (Serial No. 2032689B) (A. Oliver-G. Mills 1-1).

With the conventionally employed dielectrics the capacitors must be fired at temperatures of the order of 1200°–1400° C., which means that the internal electrodes must be of a suitable material to withstand such temperatures and that, therefore, expensive noble metals, such as platinum or palladium must be used. However, if the firing temperatures can be reduced, by a suitable choice of the dielectric, then internal electrodes with a high silver content (50–100% silver) could be used, thus reducing costs for materials and manufacture. In our co-pending G.B. Application No. 8120605 (Serial No. 2107300A) (J. M. Wheeler 1) there is disclosed a dielectric composition which can be fired at a temperature between 950° C. and 1100° C. and can thus be used with high silver content internal electrodes. These low firing temperature dielectrics comprise lead magnesium niobate ($PbMg_{\frac{1}{3}}Nb_{\frac{2}{3}}O_3$) with one or more of the following, namely lead titanate, lead stannate, lead zirconate, and some of these dielectric compositions have dielectric constants in the range 7,500–10,000, which makes them particularly suitable for multilayer ceramic capacitors. The conventionally employed ceramics (U.S. coding Z5U) are not compatible with high silver content electrodes and usually have dielectric constants lower than 7,500–10,000. The electronics industry, generally, requires smaller component, and smaller and cheaper capacitors can be obtained by producing dielectrics which are compatible with high silver content electrodes and even higher dielectric constants than the 7,500–10,000 range mentioned above with reference to our co-pending Application No. 8120605.

In another co-pending G.B. Application No. 8317265 (Serial No. 2126575)(J. M. Wheeler 2X) there is disclosed a dielectric composition comprising lead magnesium niobate ($PbMg_{\frac{1}{3}}Nb_{\frac{2}{3}}O_3$), non-stoichiometric lead iron niobate and one or more oxide additives, which may be chosen from silica, manganese dioxide, ceric oxide, lanthanum oxide, zinc oxide, alumina, tungsten oxide, nickel oxide, cobalt oxide and cuprous oxide. If, for example, three or more oxide additives are chosen from the first eight of the ten mentioned above compositions having firing temperatures between 980° C. and 1075° C. may be obtained, the dielectric constants after firing being in the range 10,600 to 16,800, making them particularly suitable for small multilayer ceramic capacitors with high silver content electrodes. Additionally the dielectric composition may comprise lead titanate ($PbTiO_3$).

In a further co-pending G.B. Application No. 8405677 (Serial No. 2137187)(J. M. Wheeler-D. A. Jackson 3-1X), there is disclosed a dielectric composition comprising lead magnesium niobate and lead zinc niobate. This dielectric composition may also include one or more oxide additives chosen from silica, maganese dioxide, zinc oxide, nickel oxide, alumina, ceric oxide, lanthanum oxide, tungsten oxide, gallium oxide, titanium dioxide and lead oxide. One or more of the following may also be added to the basic composition, bismuth stannate, bismuth titanate, lead stannate, lead zirconate and lead titanate with or without an oxide additive. Such compositions fire at temperatures between 980° C. and 1075° C. and have dielectric constants in the range 9,000 to 16,300 with Z5U temperature dependence characteristics and low tan δ(%) (dielectric loss).

Lead magnesium niobate is conventionally understood to mean $PbMg_{\frac{1}{3}}Nb_{\frac{2}{3}}O_3$, however the lead magnesium niobate which we have used in all of the dielectric compositions referred to above is not the conventional variety and has been generally referred to as $PbMg_{\frac{1}{3}}Nb_{\frac{2}{3}}O_3$. The material we employed for the results quoted in the above mentioned applications is in fact $PbMg_{0.443}Nb_{0.5001}O_3$ and since that approximates to $PbMg_{\frac{1}{3}}Nb_{\frac{2}{3}}O_3$ the latter expression has generally been used to distinguish from the conventional $PbMg_{\frac{1}{3}}Nb_{\frac{2}{3}}O_3$. Preferably, however, for our purposes the magnesium was in the range 0.35 to 0.5 and the niobium was in the range 0.4 to 0.8 i.e. $PbMg_{0.35\ to\ 0.5}Nb_{0.4\ to\ 0.6}O_3$, thus the lead magnesium niobate with which we were concerned was, generally, non-stoichiometric. The expression lead zinc niobate is conventionally understood to mean $PbZn_{\frac{1}{3}}Nb_{\frac{2}{3}}O_3$, however non-stoichiometric versions are also possible and that used in co-pending Application No. 8405677 (Wheeler 3-1X) was defined as $PbZn_{0.3\ to\ 0.5}Nb_{0.6\ to\ 0.7}O_3$.

It is an object of the present invention to provide alternative dielectric compositions which can be used with high silver content electrodes and have higher dielectric constants than the Z5U compositions.

SUMMARY OF THE INVENTION

According to one aspect of the present invention there is provided a dielectric composition comprising non-stoichiometric lead magnesium niobate, non-stoichiometric lead zinc niobate and non-stoichiometric lead iron niobate.

According to another aspect of the present invention there is provided a ceramic capacitor including dielectric fired to a temperature between 900° and 1040° C. and comprising non-stoichiometric lead magnesium niobate, non-stoichiometric lead zinc niobate and non-stoichiometric lead iron niobate.

According to a further aspect of the present invention there is provided a method of manufacturing a dielectric composition comprising non-stoichiometric lead magnesium niobate, non-stoichiometric lead zinc niobate and non-stoichiometric lead iron niobate, comprising the steps of preparing each of the constituent complex niobates separately, mixing the constituent complex niobates and firing the mixture.

According to yet another aspect of the present invention there is provided a method of manufacturing a dielectric composition comprising non-stoichiometric lead magnesium niobate, non-stoichiometric lead zinc niobate and non-stoichiometric lead iron niobate comprising the steps of mixing MgO, ZnO, $Fe_2O_3$ and $Nb_2O_5$ together, calcining the mixture at a temperature between 900° and 1200° C., and adding PbO to the calcined mixture.

The composition may comprise 50 to 80 wt % non-stoichiometric lead magnesium niobate, 10 to 35 wt % non-stoichiometric lead zinc niobate and 5 to 30 wt % non-stoichiometric lead iron niobate. Firing temperatures for the above are in the range 950° to 1040° C. and have dielectric constants in the range 13,900 to 22,100. These firing temperatures and dielectric constant values, together with acceptable values of tan δ, make the dielectric compositions suitable for multilayer ceramic capacitors with high silver content internal electrodes, although they can alternatively be used with other ceramic capacitor types, with or without electrods that are fired with the ceramic. The dielectric compositions may be used with electrode materials other than high silver content materials, such as palladium, platinum or gold. Up to 10 wt % PbO may be added to the basic ternary dielectric composition.

DESCRIPTION OF THE PREFERRED EMBODIMENTS

The dielectric compositions proposed in the present application are based on a ternary system, in particular a mixture of non-stoichiometric lead magnesium niobate (LMN), non-stoichiometric lead zinc niobate (LZN) and non-stoichiometric lead iron niobate (LIN), with or without PbO as an addition. Preferably the LMN is $PbMg_{0.35\ to\ 0.5}Nb_{0.4\ to\ 0.6}O_3$ the LZN is $PbZn_{0.3\ to\ 0.5}Nb_{0.6\ to\ 0.7}O_3$ and the LIN is $PbFe_{0.25\ to\ 0.45}Nb_{0.40\ to\ 0.55}O_3$.

In Table I measured electric parameters are quoted for the ternary system mixtures in various proportions, and for various firing temperatures. In the method column, A and B refer to two different ways of processing the dielectric powder. A refers to preparing each of the constituent complex niobates separately, mixing them and firing without an intermediate calcining step, whereas B refers to preparing each of the constituent complex niobates separately, mixing them and calcining at approximately 650° C. prior to firing. The various compositions were fired for times between one hour and two hours and aluminum electrodes suitably evaporated onto a surface thereof to enable the electrical parameters, namely; dielectric constant K; dielectric loss (tan δ); and temperature dependence (%) of the dielectric constant at −30° C., 10° C. and 85° C. with respect to that at 25° C. to be measured. Table I quotes single layer properties, that is the properties of disc samples.

TABLE 1

| Mix (wt %) | Method | Firing Temp. °C. | Dielectric Constant K @ 20° C. | tan δ @ 20° C. (%) | tan δ @ 25° C. (%) | Temp. Dependence of dielectric constant (%) −30 to 85° C. | 10 to 85° C. |
|---|---|---|---|---|---|---|---|
| 1. | A | 980 | 15500 | 1.4 | 0.6 | +9.5   −57.3 | +4.51   −56.1 |
| 75 LMN | A | 1020 | 14000 to | 1.0 to | 0.5 to | +9.3 to +12.8 | +9.4 to +14.3 |
| 20 LZN |  |  | 18500 | 1.7 | 0.7 | −56.5 to −57.6 | −54.8 to −57.6 |
| 5 LIN | A | 1040 | 15700 | 1.4 | 0.6 | +9.8   −55.5 | +9.8   −55.5 |
|  | B | 1020 | 13700 | 0.9 | 0.35 to 0.6 | +10.0 to +14.1 −53.5 to −53.6 | +9.9 to +14.1 −52.9 to −53.6 |
| 2. | A | 980 | 15300 | 1.35 | 0.55 | +8.0   −59.4 | +8.0   −57.8 |
| 75 LMN | A | 1020 | 13900 to | 1.0 to | 0.5 to | +8.4 to +12.3 | +8.4 to 12.3 |
| 10 LZN |  |  | 15300 | 1.35 | 0.8 | −55.5 to −58.5 | −55.5 to −58.5 |
| 15 LIN | B | 1020 | 15700 | 0.95 | 0.3 | +12.9   −57.9 | +12.9   −57.9 |
| 3. | A | 980 | 16000 | 2.35 | 0.9 | +4.5   −62.9 | +4.5   −53.8 |
| 70 LMN | A | 1020 | 14800 to | 1.5 | 0.6 to | +1.3 to +9.0 | +1.3 to 9.0 |
| 10 LZN |  |  | 16100 | 2.0 | 0.9 | −58.7 to −60.7 | −51.8 to −54.6 |
| 15 LIN | B | 1020 | 16000 | 1.75 | 0.65 | +8.2   −59.2 | +8.2   −55.5 |
| 4. | A | 950 | 15600 | 2.5 | 1.05 | +6.1   −61.45 | +6.1   −56.4 |
| 70 LMN | A | 980 | 16600 | 2.8 | 1.1 | +6.0   −63.8 | +6.0   −55.4 |
| 20 LZN | B | 950 | 17400 | 2.7 | 0.95 | +6.4   −63.35 | +6.4   −56.1 |
| 10 LIN | B | 980 | 18100 | 2.45 | 1.2 | +4.2   −65.4 | +4.2   −57.6 |
|  | B | 1000 | 18200 | 2.7 | 1.3 | +5.6   −63.2 | +5.6   −56.0 |
|  | B | 1020 | 19200 | 2.7 | 1.05 | +6.3   −64.7 | +6.3   −56.7 |
| 5. | A | 1040 | 14500 | 2.0 | 0.9 | +14.8   −60.1 | +14.8   −60.1 |
| 80 LMN | A | 1000 | 16300 | 1.1 | 0.4 | +15.6   −58.3 | +15.6   −58.3 |
| 10 LZN | A | 980 | 14700 | 1.2 | 0.55 | +12.3   −58.0 | +12.2   −58.0 |
| 10 LIN | B | 1020 | 14800 | 1.1 | 0.7 | +15.4   −57.6 | +15.4   −57.6 |
|  | B | 1000 | 16400 | 1.0 | 0.4 | +15.2   −58.1 | +15.2   −58.1 |
|  | B | 980 | 13900 | 0.8 | 0.4 | +12.6   −55.3 | +12.0   −55.3 |
| 6. | A | 1020 | 18600 | 4.2 | 1.6 | +3.9   −72.7 | +3.9   −58.1 |
| 67.5 LMN | A | 980 | 17000 | 3.3 | 1.3 | +4.6   −68.7 | +4.6   −56.5 |
| 12.5 LZN | B | 1020 | 18300 | 5.0 | 1.9 | +3.7   −72.1 | +3.7   −57.9 |
| 20 LIN | B | 980 | 17700 | 3.6 | 1.4 | +4.6   −69.1 | +4.6   −57.7 |
| 7. | A | 1020 | 17400 | 8.8 | 2.0 | +4.0   −70.1 | +4.0   −55.9 |
| 65 LMN | A | 980 | 17400 ? | 3.7 | 1.6 | +5.2   −67.0 | +5.2   −56.2 |
| 20 LZN | B | 1020 | 17100 | 4.3 | 1.9 | +3.7   −70.0 | +3.7   −56.0 |
| 15 LIN | B | 980 | 18000 | 3.9 | 1.43 | +4.15   −68.3 | +4.15   −56.8 |
| 8. | A | 1020 | 18500 | 3.4 | 1.6 | +7.8   −63.3 | +7.8   −57.5 |
| 65 LMN | A | 1000 | 17300 | 2.4 | 0.85 | +7.35   −62.8 | +7.35   −57.3 |
| 27.5 LZN | A | 980 | 17400 | 2.6 | 0.9 | +9.1   −62.0 | +9.1   −58.5 |
| 7.5 LIN | B | 1020 | 19700 | 3.5 | 1.4 | +9.3   −62.8 | +9.3   −57.6 |
|  | B | 1000 | 18600 | 2.8 | 1.1 | +5.6   −65.0 | +5.6   −59.6 |
|  | B | 980 | 16500 | 3.4 | 1.0 | +10.6   −65.5 | +10.6   −57.6 |
| 9. | A | 1020 | 15100 | 3.4 | 2.0 | +9.4   −73.2 | +9.4   −44.1 |

TABLE 1-continued

| Mix (wt %) | | Method | Firing Temp. °C. | Dielectric Constant K @ 20° C. | tan δ @ 20° C. (%) | tan δ @ 25° C. (%) | Temp. Dependence of dielectric constant (%) | | | |
|---|---|---|---|---|---|---|---|---|---|---|
| | | | | | | | −30 to 85° C. | | 10 to 85° C. | |
| | 60 LMN | A | 1000 | 14900 | 3.2 | 2.6 | +9.4 | −75.5 | +9.4 | −47.7 |
| { | 10 LZN | A | 980 | 15100 | 3.5 | 2.25 | +4.0 | −77.0 | +4.0 | −50.1 |
| | 30 LIN | A | 950 | 11700 | 2.8 | 1.45 | +3.15 | −70.4 | +3.15 | −41.7 |
| | | B | 1020 | 16100 | 3.7 | 2.3 | +9.4 | −74.6 | +9.4 | −46.0 |
| | | B | 1000 | 16600 | 4.4 | 2.45 | +3.0 | −76.0 | +3.0 | −51.4 |
| 10. | | A | 1040 | 17850 | 2.85 | 1.0 | +7.7 | −64.1 | +7.7 | −60.2 |
| | 60 LMN | A | 1000 | 15400 | 2.2 | 1.6 | +5.6 | −60.6 | +5.6 | −55.8 |
| { | 35 LZN | B | 1040 | 17800 | 3.7 | 1.0 | +8.1 | −64.0 | +8.1 | −60.3 |
| | 5 LIN | B | 1000 | 18200 | 2.25 | 0.9 | +9.3 | −61.6 | +9.3 | −57.4 |
| | | B | 980 | 19750 | 3.4 | 1.25 | +8.8 | −63.1 | +8.8 | −59.05 |
| 11. | | A | 1020 | 18700 | 5.1 | 3.0 | +1.1 | −71.8 | +1.1 | −54.0 |
| | 57.5 LMN | | | | | | | | | |
| { | 25 LZN | B | 1020 | 18300 | 4.7 | 2.45 | +1.4 | −70.5 | +1.4 | −52.9 |
| | 17.5 LIN | | | | | | | | | |
| 12. | | A | 1020 | 19400 | 6.2 | 3.0 | +0.7 | −71.6 | +0.7 | −54.1 |
| | 50 LMN | | | | | | | | | |
| { | 35 LZN | B | 1020 | 19700 | 6.1 | 2.9 | +0.7 | −71.2 | +0.7 | −53.6 |
| | 15 LIN | | | | | | | | | |

Using one of the compositions of Table I, namely Mix 8, which comprised 65 wt % LMN, 27.5 wt % LZN and 7.5 wt % LIN, Method B, a number of multilayer capacitors were made, fired at different temperatures for different times and various parameters measured. The results are quoted in Table 2.

An alternative method for making these compositions comprises mixing the oxides of elements which will eventually occupy B sites in the $ABO_3$ perovskite lattice, that is MgO, ZnO, $Fe_2O_3$ and $Nb_2O_3$, followed by calcining at 950°–1200° C. PbO is then mixed with the calcined mixture and the new composition may either

TABLE 2

| Firing Temp °C. | Firing Time hr | Curie Temp °C. | K @ Curie peak | K @ 20° C. | tan δ @ 20° C. (%) | tan δ @ 25° C. % | Insul. Resist. ΩF | Temp. dep of K | |
|---|---|---|---|---|---|---|---|---|---|
| | | | | | | | | −30 to +85° C. (%) | 10 to 83° C. (%) |
| 1020 | 1.0 | 10–12 | 19100 | 18300 | 3.1 | 2.1 | 11000 | +7.5 −57.7 | +7.5 −57.7 |
| 1000 | 1.5 | 9–12 | 22100 | 20900 | 3.05 | 2.0 | 7000 | +8.6 −58.6 | +8.4 −58.6 |
| 980 | 2.0 | 8–9 | 20500 | 19500 | 3.25 | 2.35 | 7600 | +8.0 −58.5 | +7.5 −58.5 |
| 950 | 2.2 | 8–11 | 20900 | 19700 | 3.10 | 2.25 | 18000 | +10.2 −59.0 | +10.0 −59.0 |

The basic ternary mixes referred to above may also be modified by the addition of up to 10 wt % lead oxide (PbO). This appears to widen the firing range and giving useful properties at lower temperatures, for example 950° C. In table 3 are quoted examples of properties obtained for disc samples with a mix comprising 60 wt % LMN, 35 wt % LZN and 5 wt % LIN which was prepared using method B and 4 wt % PbO subsequently added.

be calcined prior to firing, or fired without further heat treatment. This alternate method gives overall compositions the same as those obtained by preparing and mixing the complex niobates as described above. In the following Table 4 there are quoted examples of properties of disc samples prepared by the alternative method and which have the same overall composition as Mix 11 of Table 1, namely 57.5 wt % LMN, 25 wt % LZN and 17.5 wt % LIN.

TABLE 3

| Firing Temp. °C. | K @ 20° C. | tan δ @ 20° C. (%) | tan δ @ 25° C. (%) | Temp. dep. of K (%) | |
|---|---|---|---|---|---|
| | | | | −30 to 85° C. | 10 to 85° C. |
| 1000 | 19100 | 3.05 | 1.05 | +7.4 −64.7 | +7.4 −60.1 |
| 980 | 18000 | 2.1 | 0.75 | +10.2 −61.2 | +10.2 −59.7 |
| 950 | 17950 | 2.2 | 0.7 | +11.0 −59.7 | +11.0 −58.4 |

TABLE 4

| x* °C. | y* Yes/No | Firing Temp. °C. | K @ 20° C. | tan δ @ 20° C. % | tan δ @ 25° C. % | Temp. Dep. of K | |
|---|---|---|---|---|---|---|---|
| | | | | | | −30 to 85° C. % | 10 to 85° C. % |
| 950 | No | 980 | 18400 | 4.95 | 2.8 | +1.1 −71.9 | +1.1 −55.7 |
| | | 1000 | 19300 | 5.15 | 2.7 | +14.1 −72.2 | +4.1 −55.1 |
| | | 1020 | 17700 | 5.3 | 2.9 | +3.7 −72.1 | +3.7 −52.4 |
| | Yes | 980 | 18400 | 4.8 | 2.9 | +1.7 −72.1 | +1.7 −56.5 |
| | | 1000 | 18000 | 5.2 | 3.6 | +3.1 −71.7 | +3.1 −53.2 |
| | | 1020 | 18800 | 5.45 | 2.65 | +3.2 −72.2 | +3.2 −55.4 |
| 1050 | No | 980 | 18400 | 4.9 | 2.3 | +1.3 −72.2 | +1.3 −56.2 |
| | | 1000 | 18900 | 4.75 | 2.95 | +2.8 −72.6 | +2.8 −53.5 |
| | | 1020 | 20400 | 6.3 | 3.3 | +2.0 −73.6 | +2.0 −57.0 |
| | Yes | 980 | 16000 | 3.95 | 2.05 | +1.3 −70.4 | +1.3 −52.1 |
| | | 1000 | 18200 | 5.8 | 2.4 | +3.3 −72.5 | +3.3 −54.0 |
| | | 1020 | 20200 | 5.7 | 3.2 | +1.3 −73.4 | +1.3 −54.1 |

TABLE 4-continued

| $x^*$ °C. | $y^*$ Yes/No | Firing Temp. °C. | K @ 20° C. | tan δ @ 20° C. % | tan δ @ 25° C. % | Temp. Dep. of K | |
|---|---|---|---|---|---|---|---|
| | | | | | | −30 to 85° C. % | 10 to 85° C. % |
| 1200 | No | 980 | 17100 | 3.2 | 1.75 | +0.5 −67.3 | +0.5 −53.6 |
| | | 1000 | 18900 | 4.3 | 2.15 | +1.5 −70.5 | +1.5 −55.5 |
| | | 1020 | 17900 | 3.95 | 1.5 | +4.3 −68.8 | +4.3 −55.9 |
| | Yes | 980 | 15100 | 3.3 | 1.6 | +0.2 −67.1 | +0.2 −52.7 |
| | | 1000 | 18000 | 4.3 | 2.4 | +1.5 −70.3 | +1.5 −55.4 |
| | | 1020 | 17500 | 4.1 | 1.55 | +3.3 −68.9 | +3.3 −56.5 |

*x = B site oxide mix calcining temperature
y = calcined after PbO addition?

The above results indicate that some of the compositions have temperature coefficients of capacitance in the Z5U range, namely between 10° C. and 85° C. the capacitance variation remains within the band +22% to −56% of the 25° value. Others of the compositions fall in the y5 V range, namely between −30° and 85° C., the capacitance variation remains within the band +22% to −82% of the 25° C. value.

A method of manufacturing a mutilayer ceramic capacitor using the dielectric compositions described above may comprise the steps of screen printing a plurality of electrodes on each of a plurality of unfired dielectric sheets with a high silver content ink; assembling a stack of each printed sheets with the electrodes of alternate layers arranged relative to one another as appropriate to the particular construction employed, for example sideways stepped or overlapping crosswise; pressing the sheets together with extra blank ceramic sheets applied to the top and bottom of the stack to give an adequate voltage margin, if required; cutting the sheets to form individual capacitor components and firing the individual components at a temperature between 900° and 1040° C. Subsequently the electrodes between every other sheet may be conventionally connected by the appropriate application of conductive paint, for example, to opposite side faces of the stack. Whereas the lowest firing temperature quoted in the specific examples is 950° C. it is considered that firing at lower temperatures, down to say 900° C., will result in compositions with comparable and acceptable parameters.

I claim:

1. A dielectric composition comprising non-stoichiometric lead magnesium niobate, non-stoichiometric lead zinc niobate and non-stoichiometric lead iron niobate.

2. A composition as claimed in claim 1 comprising between 50 and 80 wt % non-stoichiometric lead magnesium niobate, between 10 and 35 wt % non-stoichiometric lead zinc niobate and between 5 and 30 wt % non-stoichiometric lead iron niobate.

3. A composition as claimed in claim 2 further including up to 10 wt % lead oxide (PbO).

4. A composition as claimed in claim 3 comprising 60 wt % lead magnesium niobate, 35 wt % lead zinc niobate, 5 wt % lead iron niobate and 4 wt % lead oxide.

5. A dielectric composition as claimed in claim 1 and whose constituents are in the proportions indicated in one of the mix examples quoted in Table 1.

6. A ceramic capacitor including dielectric fired at a temperature between 900° and 1040° C. and comprising non-stoichiometric lead magnesium niobate, non-stoichiometric lead zinc niobate and non-stoichiometric lead iron niobate.

7. A ceramic capacitor as claimed in claim 6, the dielectric including up to 10 wt % lead oxide.

8. A ceramic capacitor as claimed in claim 6 and including high silver content internal electrodes fired with the dielectric.

9. A method of manufacturing a dielectric composition comprising the steps of separately preparing non-stoichiometric lead magnesium niobate, non-stoichiometric lead zinc niobate and non-stoichiometric lead iron niobate, mixing the separately prepared niobates and firing the mixture.

10. A method as claimed in claim 9 and including the step of calcining the mixture at approximately 650° C. prior to firing.

11. A dielectric composition made by a method as claimed in claim 10 and in accordance with one of the possibilities quoted in Table 3.

12. A method of manufacturing a dielectric composition comprising non-stoichiometric lead magnesium niobate, non-stoichiometric lead zinc niobate and non-stoichiometric lead iron niobate comprising the steps of mixing MgO, ZnO, $Fe_2O_3$ and $Nb_2O_5$ together, calcining the mixture at a temperature between 900° and 1200° C., and adding PbO to the calcined mixture.

13. A method as claimed in claim 12 and including the step of further calcining the mixture following addition of the PbO.

14. A dielectric composition made by a method as claimed in claim 12 and in accordance with one of the possibilities quoted in Table 4.

15. A multilayer ceramic capacitor including a dielectric composition comprising 65 wt % non-stoichiometric lead magnesium niobate, 27.5 wt % non-stoichiometric lead zinc niobate and 7.5 wt % non-stoichiometric lead iron niobate, manufactured by a method comprising preparing each of said three complex niobates separately, mixing the separately prepared niobates, calcining the mixture, forming a plurality of dielectric sheets from the calcined mixture, screen-printing a plurality of electrodes onto each of a plurality of dielectric sheets, assembling a stack of the resultant screen-printed sheets, pressing the stack together, dividing the stack into individual capacitor components and firing the individual components at the conditions specified in Table 2.

* * * * *